US008095240B2

United States Patent
Chiu et al.

(10) Patent No.: US 8,095,240 B2
(45) Date of Patent: Jan. 10, 2012

(54) METHODS FOR STARTING AND OPERATING A THERMAL ABATEMENT SYSTEM

(75) Inventors: Ho-Man Rodney Chiu, San Jose, CA (US); Daniel O. Clark, Pleasanton, CA (US); Shaun W. Crawford, San Ramon, CA (US); Jay J. Jung, Sunnyvale, CA (US); Youssef A. Loldj, Sunnyvale, CA (US); Robbert M. Vermeulen, Pleasant Hill, CA (US)

(73) Assignee: Applied Materials, Inc., Santa Clara, CA (US)

( * ) Notice: Subject to any disclaimer, the term of this patent is extended or adjusted under 35 U.S.C. 154(b) by 636 days.

(21) Appl. No.: 12/257,888

(22) Filed: Oct. 24, 2008

(65) Prior Publication Data
US 2009/0098492 A1   Apr. 16, 2009

Related U.S. Application Data

(63) Continuation-in-part of application No. 10/991,740, filed on Nov. 18, 2004, now Pat. No. 7,682,574.

(60) Provisional application No. 60/982,391, filed on Oct. 24, 2007, provisional application No. 60/982,393, filed on Oct. 24, 2007.

(51) Int. Cl.
*B01J 19/00* (2006.01)
*G05B 21/00* (2006.01)

(52) U.S. Cl. ......... 700/266; 423/240 R; 431/12; 431/42; 422/108; 422/172

(58) Field of Classification Search .................. 422/108, 422/116, 172, 235; 700/266, 274; 431/12, 431/42; 438/14; 423/210, 235, 240 R
See application file for complete search history.

(56) References Cited

U.S. PATENT DOCUMENTS

| | | | |
|---|---|---|---|
| 3,185,846 A | 5/1965 | Gilbert et al. | |
| 3,276,506 A | 10/1966 | Micko | |
| 3,299,416 A | 1/1967 | Koppel | |
| 3,698,696 A | 10/1972 | Rauskolb | |
| 4,059,386 A | 11/1977 | Eising | |
| 4,087,229 A | 5/1978 | Teichert et al. | |
| 4,243,372 A | 1/1981 | Cade | |
| 4,280,184 A | 7/1981 | Weiner et al. | |
| 4,373,897 A | 2/1983 | Torborg | |
| 4,392,821 A | 7/1983 | Fussl et al. | |
| 4,443,793 A | 4/1984 | Hall, Jr. | |

(Continued)

FOREIGN PATENT DOCUMENTS
EP   0 044 670 A1   1/1982
(Continued)

OTHER PUBLICATIONS

Examiner Interview Summary of U.S. Appl. No. 10/991,740 mailed Nov. 2, 2009.

(Continued)

*Primary Examiner* — Nina Bhat
(74) *Attorney, Agent, or Firm* — Dugan & Dugan, PC

(57) ABSTRACT

A flame sensor apparatus for use with a flame heated thermal abatement reactor is provided, including a flame sensor adapted to sense a flame within the thermal abatement reactor; and a shutter adapted to selectively block the transmission of radiation from the flame to the flame sensor.

5 Claims, 6 Drawing Sheets

U.S. PATENT DOCUMENTS

| | | | |
|---|---|---|---|
| 4,482,312 A | | 11/1984 | Cade |
| 4,483,672 A | | 11/1984 | Wallace et al. |
| 4,555,389 A | | 11/1985 | Soneta et al. |
| 4,680,004 A | * | 7/1987 | Hirt ................................. 431/5 |
| 4,828,484 A | | 5/1989 | Youtz |
| 4,981,722 A | | 1/1991 | Moller et al. |
| 5,123,836 A | | 6/1992 | Yoneda et al. |
| 5,264,708 A | | 11/1993 | Hijikata |
| 5,362,458 A | | 11/1994 | Saleem et al. |
| 5,419,358 A | | 5/1995 | Sun |
| 5,510,093 A | | 4/1996 | Bartz et al. |
| 5,603,905 A | | 2/1997 | Bartz et al. |
| 5,649,985 A | | 7/1997 | Imamura |
| 5,749,720 A | | 5/1998 | Fukuda et al. |
| 5,833,888 A | | 11/1998 | Arya et al. |
| 5,935,283 A | | 8/1999 | Sweeney et al. |
| 5,938,422 A | | 8/1999 | Smith et al. |
| 5,957,678 A | | 9/1999 | Endoh et al. |
| 6,010,576 A | | 1/2000 | Lin |
| 6,187,080 B1 | | 2/2001 | Ping-Chung et al. |
| 6,234,787 B1 | * | 5/2001 | Endoh et al. ................. 431/353 |
| 6,261,524 B1 | * | 7/2001 | Herman et al. ............... 422/173 |
| 6,322,756 B1 | | 11/2001 | Arno et al. |
| 6,345,768 B1 | | 2/2002 | Inagaki et al. |
| 6,419,455 B1 | | 7/2002 | Rousseau et al. |
| 6,511,641 B2 | * | 1/2003 | Herman et al. ............... 423/210 |
| 6,676,913 B2 | | 1/2004 | Rossin |
| 6,712,603 B2 | | 3/2004 | Pettit |
| 6,752,974 B2 | | 6/2004 | Dunwoody et al. |
| 6,875,007 B2 | | 4/2005 | Pettit |
| 6,969,250 B1 | | 11/2005 | Kawamura et al. |
| 6,988,017 B2 | | 1/2006 | Pasadyn et al. |
| 7,001,527 B2 | | 2/2006 | Stever et al. |
| 7,057,182 B2 | | 6/2006 | Kitchin et al. |
| 7,058,470 B2 | | 6/2006 | Tanaka et al. |
| 7,160,521 B2 | | 1/2007 | Porshnev et al. |
| 7,194,369 B2 | | 3/2007 | Lundstedt et al. |
| 7,316,721 B1 | | 1/2008 | Redden et al. |
| 7,682,574 B2 | * | 3/2010 | Chiu et al. ................... 422/108 |
| 7,736,599 B2 | * | 6/2010 | Chiu et al. ................... 422/168 |
| 2003/0189967 A1 | * | 10/2003 | Rumelin et al. ............... 374/31 |
| 2004/0161718 A1 | | 8/2004 | Pettit |
| 2004/0188360 A1 | | 9/2004 | Armstrong et al. |
| 2004/0213721 A1 | * | 10/2004 | Arno et al. ................. 423/240 R |
| 2006/0104878 A1 | | 5/2006 | Chiu et al. |
| 2006/0104879 A1 | | 5/2006 | Chiu et al. |
| 2007/0166205 A1 | | 7/2007 | Holst et al. |
| 2007/0274876 A1 | | 11/2007 | Chiu et al. |

FOREIGN PATENT DOCUMENTS

| | | |
|---|---|---|
| EP | 0 694 735 | 1/1996 |
| EP | 0 752 557 A2 | 1/1997 |
| EP | 0 802 370 A2 | 10/1997 |
| EP | 0 809 071 | 11/1997 |
| EP | 916388 A2 | 5/1999 |
| EP | 0 919 773 A1 | 6/1999 |
| EP | 1 143197 | 10/2001 |
| EP | 1431 657 | 6/2004 |
| FR | 2 062 565 | 6/1971 |
| GB | 2 028 998 A | 3/1980 |
| GB | 2 036 384 A | 6/1980 |
| GB | 2 183 023 A | 5/1987 |
| JP | 02 225905 A | 9/1990 |
| JP | 06 313532 A | 11/1994 |
| JP | 09 133333 A | 5/1997 |
| JP | 10-318540 | 12/1998 |
| JP | 2001082723 A | 3/2001 |
| TW | 536604 | 6/2003 |
| WO | WO 97/45677 | 12/1997 |
| WO | WO 98/29181 A1 | 7/1998 |
| WO | WO 2006/083356 | 8/2006 |

OTHER PUBLICATIONS

Taiwan Search Report of Taiwan Patent Application No. 094140667 dated Aug. 9, 2010.
Fireye CU-20 "Documentation for 45UV5 and 255U3" May 1994, pp. 1-7.
International Search Report and Written Opinion of International Application No. PCT/US2008/081098 mailed Dec. 29, 2008.
International Search Report and Written Opinion of International Application No. PCT/US2005/042201 mailed Nov. 24, 2008.
Preliminary Amendment of U.S. Appl. No. 10/991,740 mailed May 18, 2007.
Office Action of U.S. Appl. No. 10/991,740 mailed Dec. 13, 2007.
Apr. 14, 2008 Response to Office Action of U.S. Appl. No. 10/991,740 mailed Dec. 13, 2007.
Final Office Action of U.S. Appl. No. 10/991,740 mailed Jul. 3, 2008.
Sep. 3, 2008 Response to Final Office Action of U.S. Appl. No. 10/991,740 mailed Jul. 3, 2008.
Notice of Allowance of U.S. Appl. No. 10/991,740 mailed Sep. 17, 2008.
Office Action of U.S. Appl. No. 10/991,740 mailed Mar. 4, 2009.
Jun. 30, 2009 Response to Office Action of U.S. Appl. No. 10/991,740 mailed Mar. 4, 2009.
Notice of Allowance of U.S. Appl. No. 10/991,740 mailed Oct. 23, 2009.
Taiwan Search Report of Taiwan Patent Application No. 094140667 dated Dec. 3, 2008.
International Preliminary Report on Patentability and Written Opinion of International Application No. PCT/US2008/081098 mailed May 6, 2010.
International Search Report dated Jul. 27, 2006, relating to International Application No. PCT/US05/042201.
International Search Report and Written Opinion of International Application No. PCT/US05/042201 dated Jan. 28, 2009.

* cited by examiner

METHODS FOR STARTING AND OPERATING A THERMAL ABATEMENT SYSTEM

The present application is a continuation-in-part of U.S. patent application Ser. No. 10/991,740, filed Nov. 18, 2004 and entitled "SAFETY, MONITORING AND CONTROL FEATURES FOR THERMAL ABATEMENT REACTOR", now U.S. Pat. No. 7,682,574 and also claims priority to U.S. Provisional Patent Application Ser. Nos. 60/982,391, filed Oct. 24, 2007 and entitled "METHODS AND APPARATUS FOR STARTING AND OPERATING A THERMAL ABATEMENT SYSTEM"; and 60/982,393, filed Oct. 24, 2007 and entitled "METHODS AND APPARATUS FOR STARTING AND OPERATING A THERMAL ABATEMENT SYSTEM", all three of which are hereby incorporated herein by reference in their entirety for all purposes.

CROSS REFERENCE TO RELATED APPLICATIONS

Co-owned U.S. patent application Ser. No. 10/987,921 filed Nov. 12, 2004 in the names of Ho-Man Rodney Chiu, Daniel O. Clark, Shaun W. Crawford, Jay J. Jung, Leonard B. Todd and Robbert Vermeulen, now U.S. Pat. No. 7,736,599 entitled "REACTOR DESIGN TO REDUCE PARTICLE DEPOSITION DURING PROCESS ABATEMENT", is hereby incorporated by reference herein in its entirety for all purposes.

FIELD OF THE INVENTION

The present application relates to electronic device manufacturing, and more particularly to methods and apparatus for starting and operating a thermal abatement system.

BACKGROUND OF THE INVENTION

Gaseous effluent streams from the manufacturing of electronic materials, devices, products, solar cells and memory articles (hereinafter "electronic devices") may involve a wide variety of chemical compounds, organic compounds, oxidizers, breakdown products of photo-resist and other reagents, as well as other gases and suspended particulates that may be desirably removed from the effluent streams before the effluent streams are vented from a process facility into the atmosphere.

Effluent streams to be abated may include species generated by an electronic device manufacturing process and/or species that were delivered to the electronic device manufacturing process and which passed through the process chamber without chemical alteration. As used herein, the term "electronic manufacturing process" is intended to be broadly construed to include any and all processing and unit operations in the manufacture of electronic devices and/or LCD products, as well as all operations involving treatment or processing of materials used in or produced by an electronic device and/or LCD manufacturing facility, as well as all operations carried out in connection with the electronic device and/or LCD manufacturing facility not involving active manufacturing (examples include conditioning of process equipment, purging of chemical delivery lines in preparation of operation, etch cleaning of process tool chambers, abatement of toxic or hazardous gases from effluents produced by the electronic device and/or LCD manufacturing facility, etc.). As used herein, "effluent streams" and "waste streams" are intended to be synonymous terms.

Thermal reactors have increasingly been installed as point-of-use abatement systems to process effluent waste streams to decompose toxic materials, converting them to less toxic forms. For example, thermal abatement reactors may abate waste effluent components including, but not limited to, $CF_4$, $C_2F_6$, $SF_6$, $C_3F_8$, $C_4F_8$, $C_4F_8O$, $SiF_4$, $BF_3$, $BH_3$, $B_2H_6$, $B_5H_9$, $NH_3$, $PH_3$, $SiH_4$, $SeH_2$, $Cl_2$, $HCl$, $HF$, $HBr$, $WF_6$, $H_2$, $Al(CH_3)_3$, alcohols, oxidizers such as $O_3$, $NF_3$, and $ClF_3$, $F_2$ primary and secondary amines, acid gases, organosilanes, organometallics, and halosilanes.

As the use of thermal abatement increases, so has the necessity for developing safety, reliability, monitoring and control features for thermal reactors. Safety features are especially important, because the abatement of effluent waste streams in thermal reactors may be facilitated by the introduction of fuels, e.g., methane, natural gas and/or hydrogen, to the thermal reactors for combustion and oxidation therein.

Accordingly, it would be advantageous to provide methods and apparatus to increase the safety and reliability of thermal abatement reactors.

SUMMARY OF THE INVENTION

In some aspects, a flame sensor apparatus for use with a flame heated thermal abatement reactor is provided, including a flame sensor adapted to sense a flame within the thermal abatement reactor; and a shutter adapted to selectively block the transmission of radiation from the flame to the flame sensor.

In some aspects, a method for starting a thermal abatement reactor is provided, including the steps: a) igniting a pilot flame in the thermal abatement reactor; b) detecting the pilot flame with a flame sensor; c) blocking a transmission of flame radiation from the pilot flame to the flame sensor; and d) stopping a flow of fuel to the pilot flame if the flame sensor indicates that the flame sensor detects a flame while the transmission of the flame radiation is blocked in step c).

In some aspects, a method for operating a thermal abatement reactor is provided, including the steps: a) igniting a burner flame; b) detecting the burner flame with a flame sensor; c) stopping a flow of fuel to the burner flame if the flame sensor does not detect the burner flame in step b); d) blocking a transmission of flame radiation from the burner flame to the flame sensor; and e) stopping the flow of fuel to the burner flame if the flame sensor indicates that the flame sensor detects the burner flame while the transmission of flame radiation is blocked in step d).

Other features and aspects of the present invention will become more fully apparent from the following detailed description, the appended claims and the accompanying drawings.

DETAILED DESCRIPTION

Figure 1:
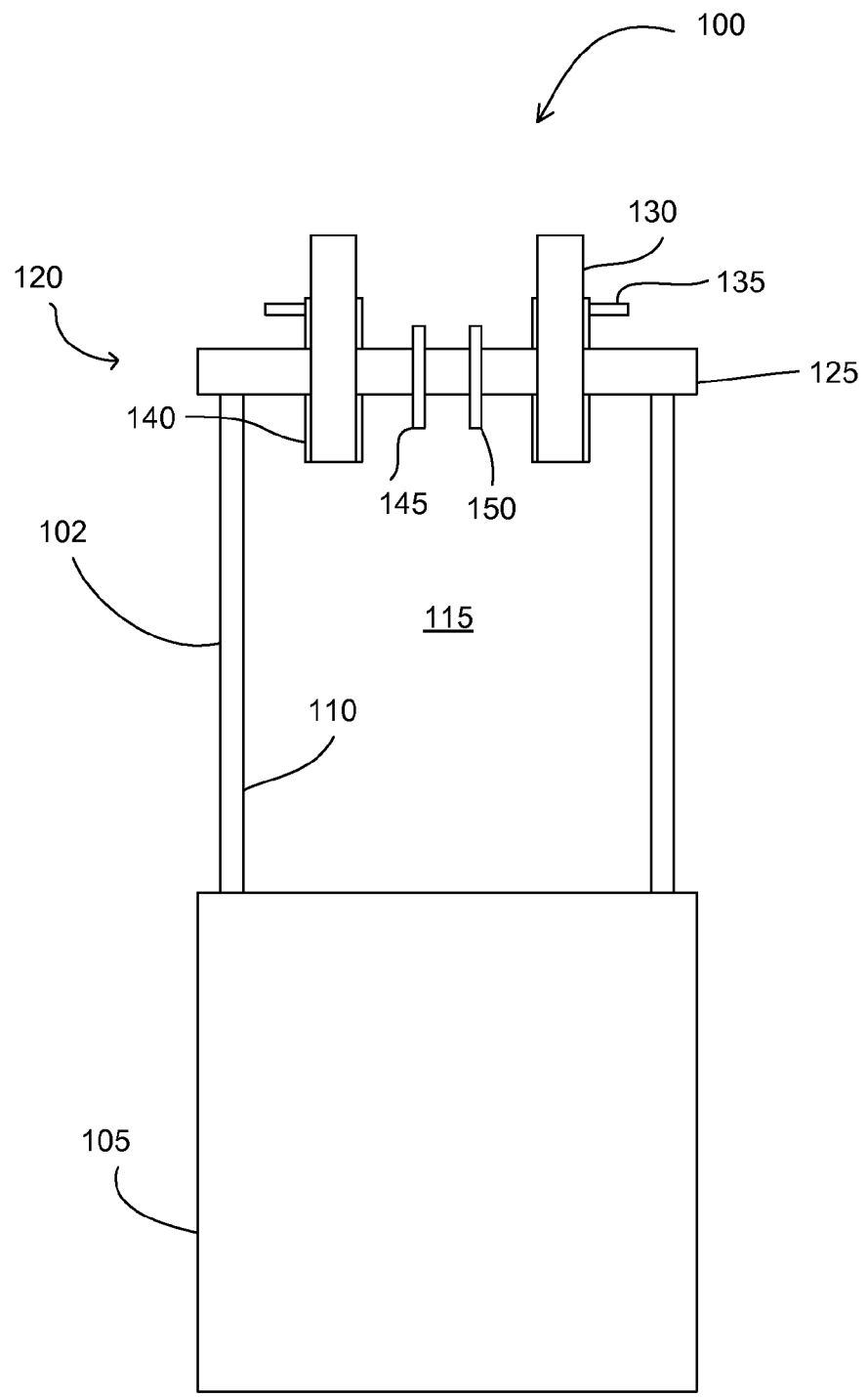
FIG. 1 is a schematic depiction of a generalized thermal abatement reactor.

As described above, thermal abatement reactors may use fuel combustion as a source of heat for use in abating undesirable species contained in electronic device manufacturing process effluent. Such thermal abatement reactors may typically feature one or more pilot jets and one or more main burner jets. The pilot jets may be used to supply a small but sufficient amount of fuel, or fuel and oxidant, to form a pilot flame. It is to be understood that in the following description "fuel, or fuel and oxidant" may be referred to simply as "fuel". The main burner jets may be adapted to form main burner flames which may be used to heat the thermal abatement reactor and its contents.

Before a thermal abatement reactor is started, there should be no fuel flowing from either the pilot jet or the burner jets. This condition may be referred to herein as "shut down" or "off". When a shut down abatement reactor is to be started, the following startup procedure may typically be used: the abatement reactor may be purged with nitrogen, fuel may be flowed to a pilot burner and ignited to form a pilot flame; and then fuel may be flowed to one or more main burner jets to form burner flames.

If fuel is supplied to the reactor while the pilot flame is not burning, there may be a risk of deflagration and/or explosion. For this reason, as disclosed in co-owned U.S. patent application Ser. No. 10/991,740 filed Nov. 18, 2004, and entitled "SAFETY, MONITORING AND CONTROL FEATURES FOR THERMAL ABATEMENT REACTOR", flame sensors have advantageously been installed on thermal reactors to ensure that fuel is not supplied to the reactor unless the pilot flame is burning. It may be possible, however, for a pilot flame sensor to malfunction, giving a false flame-on indication, e.g., to a system controller, that the pilot flame is burning. This may result in fuel being supplied to the reactor while the pilot flame is not burning and may increase the risk of deflagration and/or explosion.

Furthermore, once the main burner flames have been established, and the thermal abatement reactor is in an operational mode, it may be possible in some circumstances for the main burner flames to stop burning, resulting in unburned fuel entering the reaction chamber. This may also result in deflagration and/or explosion. It is known that flame sensors may be installed on thermal reactors to detect such a situation and to ensure that fuel is not supplied to the reactor if the flame stops burning. It may be possible, however, for such flame sensors to malfunction and to continue to indicate the existence of a burner flame after the flame has stopped burning. This may similarly result in unburned fuel being supplied to the reactor, risking deflagration and/or explosion.

The present invention provides methods and apparatus for safely and reliably starting and operating a thermal abatement reactor and for detecting a malfunctioning flame sensor. In order to reduce the risk of unburned fuel being introduced into a thermal reaction chamber, and therefore reduce the risk of deflagration and/or explosion, the present invention provides flame sensor testing apparatus (hereinafter "flame sensor apparatus") and methods.

As stated above, when a flame is present in a thermal abatement reactor, a flame sensor may receive radiation which is produced by a flame (hereinafter "flame radiation"). The presence of flame radiation emanating from inside the thermal reactor may indicate that a flame exists therein, and the flame sensor may report a flame-on condition to a controller. In order to address the possibility that the flame sensor may fail and continue to report a flame-on condition during a flame-off condition, the flame sensor apparatus of the present invention may include a shutter which may be used by the controller to test the operability or integrity of the flame sensor (sometimes referred to herein as "fault test"). Thus, during an actual flame-on condition, the shutter may be closed to block flame radiation from reaching the flame sensor. With the shutter closed, the controller should receive a flame-off signal from the flame sensor. If the controller receives a flame-off signal from the flame sensor during this test, the controller may determine that the flame sensor is operating properly. On the other hand, if the controller receives a flame-on signal from the flame sensor while the shutter is closed, the controller may then determine that the flame sensor is defective, and shut down the thermal reaction chamber. The controller may use the shutter to test the flame sensor both during start up and during normal operation of the thermal abatement reactor.

During startup, the controller may use the procedure described above to test the flame sensor at two different stages of startup. In the first stage, the pilot stage, the controller may test the flame sensor once the flame sensor has detected the pilot flame. At this stage, if the controller determines that the flame sensor is malfunctioning, the controller may shut down the thermal abatement reactor and abort the startup. If, however, the controller determines that the flame sensor is not malfunctioning, the controller may command fuel to flow to the main burner jets. In the second stage, the main burner ignition stage, the controller may fault test the flame sensor once the flame sensor has detected the main burner flame. Once again, if the flame sensor reports to the controller that the flame sensor detects a flame while the shutter is closed, the controller may determine that the flame sensor is malfunctioning, and the controller may shut down the thermal abatement reactor and abort the startup. If on the other hand the controller determines that the flame sensor is not malfunctioning, the controller may continue to command fuel to flow to the main burner jets. The controller may perform the flame sensor fault test periodically throughout the operation of the thermal abatement reactor.

FIG. 1 depicts a generalized thermal abatement reactor 100 having a thermal reaction unit 102 and a lower quenching chamber 105. The thermal reaction unit 102 may include thermal reactor walls 110 defining a thermal reaction chamber 115, and an inlet adaptor 120, including a top plate 125, at least one each of a waste stream inlet 130, a fuel inlet 135, a burner jet 140, a pilot 145, and an oxidant inlet 150. In one embodiment, the thermal reactor walls 110 may be constructed from a reticulated ceramic material, such as yttria-doped alumina, although other materials may be used. In some embodiments the fuel used may include natural gas, hydrogen, methane or any other suitable fuel source.

In operation, waste streams may enter the thermal reaction chamber 115 from at the least one waste stream inlet 130 provided in the inlet adaptor 120, and a fuel or fuel/oxidant mixture may enter the thermal reaction chamber 115 from the at least one burner jet 140. The pilot 145 may include a pilot flame which may be used to ignite the burner jets 140 to form burner flames, creating thermal reaction chamber 115 temperatures in a range from about 500° C. to about 2000° C. The high temperatures may facilitate decomposition of the pollutants contained in the waste streams that enter the thermal reaction chamber 115.

Following decomposition/combustion, effluent gases may pass to the lower chamber 105 wherein a water curtain (not shown) may be used to cool the walls of the lower chamber and inhibit deposition of particulate matter thereon. Further downstream of the water curtain, a water spray (not shown) may be positioned within the lower chamber 105 to cool the gas stream and remove particulate matter and water soluble or reactive gases. Gases passing through the lower chamber may be released to the atmosphere or, alternatively, may be directed to additional treatment units including, but not limited to, liquid/liquid scrubbing, physical and/or chemical adsorption, cold traps, electrostatic precipitators, cyclones and/or any other suitable treatment units.

Figure 2:
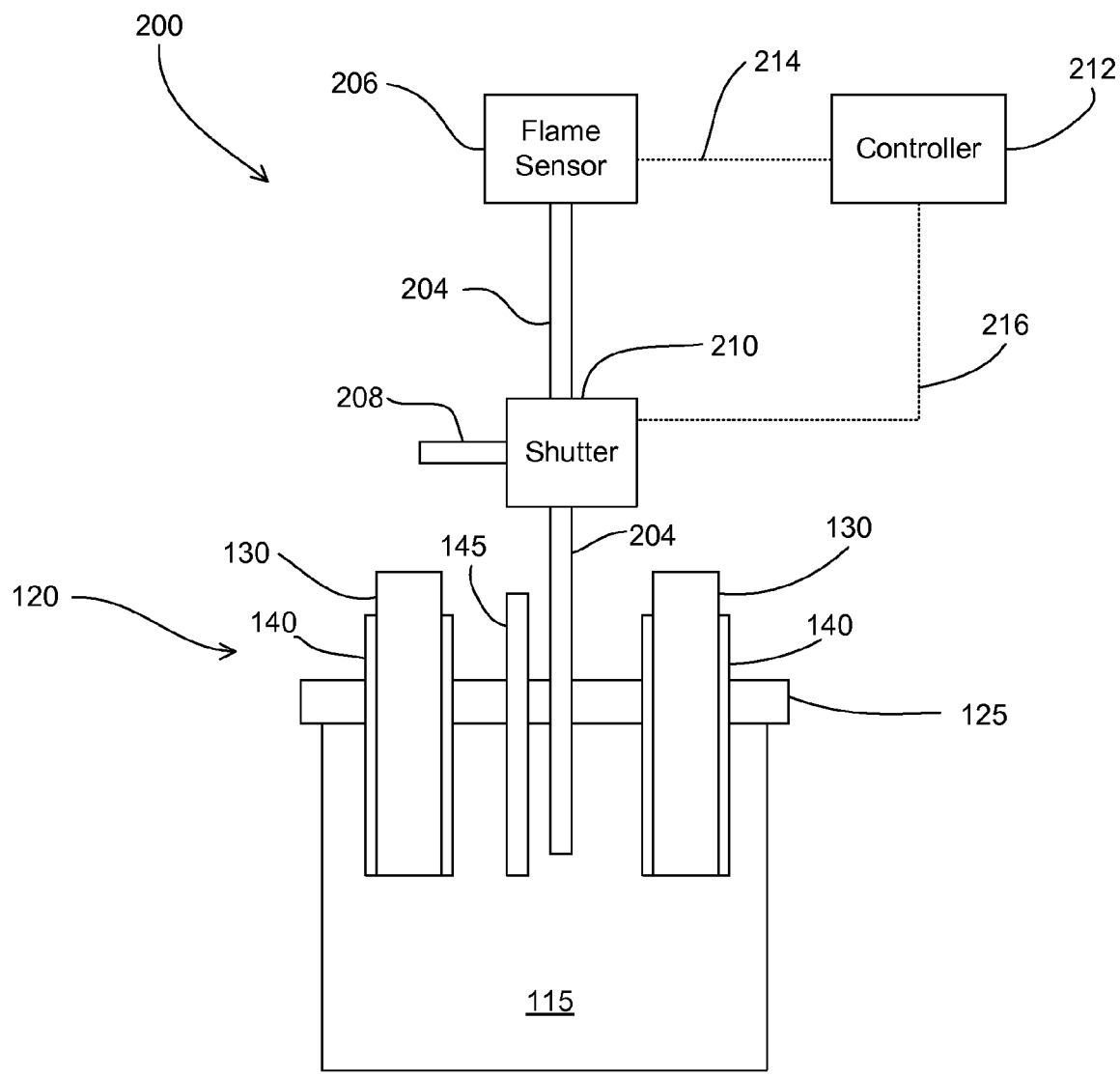
FIG. 2 is a schematic depiction of a flame sensor apparatus of the present invention.

FIG. 2 is a schematic depiction of a flame sensor apparatus 200 of the present invention, which may be used with a flame heated thermal abatement unit or reaction chamber such as abatement unit 100. A radiation conduit 204 may be positioned to pass through the top plate 125 of the inlet adapter 120, and the bottom end of the radiation conduit 204 may be located within the thermal reaction chamber 115 and the radiation conduit 204 may be adapted to receive flame radiation from a pilot and/or a main burner flame, and to conduct the flame radiation to a flame sensor 206. In some embodiments, the radiation conduit 204 may be in fluid communication with the thermal reaction chamber 115. A purge gas, e.g., introduced at a purge gas inlet 208, may flow continuously down the radiation conduit 204 to reduce particulate clogging and back diffusion within and/or at the bottom end of the conduit. The purge gas may be clean dry air (CDA), air, oxygen, nitrogen, argon, or any inert gas. It is to be appreciated by one skilled in the art that the structure and construction of the flame sensor apparatus described herein may be readily modified for use in any system where a flame needs to be sensed.

The flame sensor 206 may be positioned to radiatively communicate with the thermal reaction chamber via the radiation conduit 204. As defined herein, "radiative communication" means that flame radiation from the thermal reaction chamber may be detectable by the flame sensor. The flame sensor may be hermetically sealed and mechanically resilient and may include a radiation cell with a quartz or sapphire lens, a lamp with lamp power supply and a detector assembly. The lens may isolate the detector from a hot reactor atmosphere. Any suitable flame sensor may be used. A spectral range for the flame sensor may in some embodiments correspond to an ultraviolet range and may be in a range from about 10 nm to about 400 nm, and in other embodiments may be in a range from about 190 nm to about 320 nm. It will be understood by one skilled in the art that the flame sensor may employ a different spectral range depending on the fuel used in the thermal reactor. For example, when the fuel is natural gas, the emission of interest may be the OH* emission, corresponding to $\lambda=309$ nm (see, Timmerman, B. H., Bryanston-Cross, P. J., Dunkley, P., The 16th Symposium on Measuring Techniques in Transonic and Supersonic Flow in Cascades and Turbomachines, Cambridge, UK, September 2002, pp. 1-7). An example of a suitable flame sensor may be the UVS 6, manufactured by Kromschroder, Inc. (Hudson, Ohio).

The flame sensor apparatus 200 may include a shutter 210, which may be located and adapted to enable the shutter 210 to selectively block the flame sensor 206 from receiving flame radiation from inside of the thermal reaction chamber 115. The shutter may enable a controller 212 to determine whether the flame sensor 206 is operating correctly. The controller 212 may be connected to the flame sensor through signal line 214 and/or to the shutter 210 through signal line 216. Signal lines 214, 216 are indicated with dotted lines. It should be understood that the phrase "block the flame sensor from receiving flame radiation from inside of the thermal reaction chamber" is construed herein to include "significantly reducing the amount of flame radiation received by the flame sensor from inside of the thermal reaction chamber". Thus, even if a shutter 210 does not completely block the flame radiation from reaching the flame sensor, an amount of radiation blocked may be deemed sufficient if the radiation which does reach the flame sensor while the shutter is in the closed position is insufficient to cause a properly functioning flame sensor to indicate a flame-on condition.

Figure 3A:
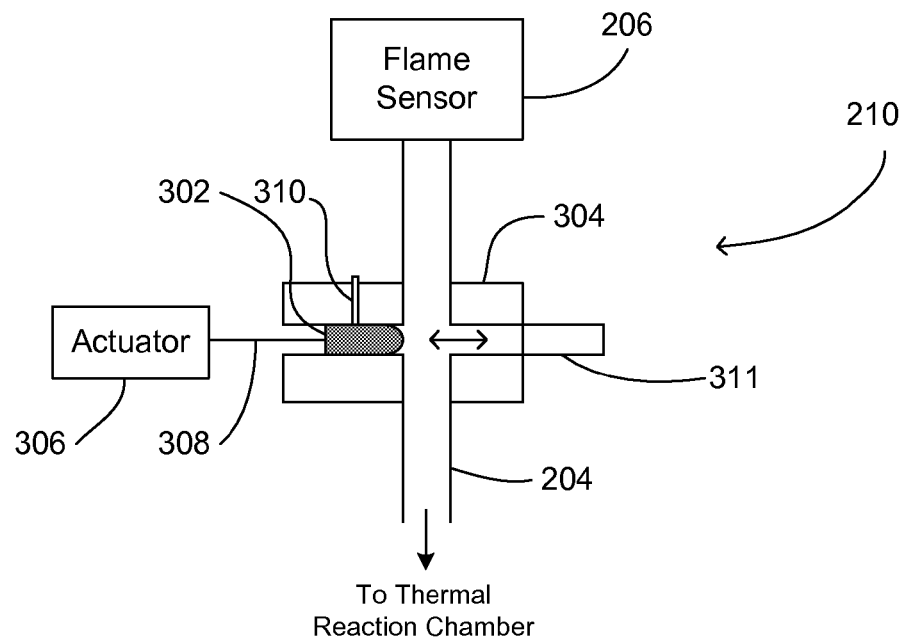
FIG. 3A is a schematic depiction of a shutter assembly of the present invention in an open configuration.
Figure 3B:
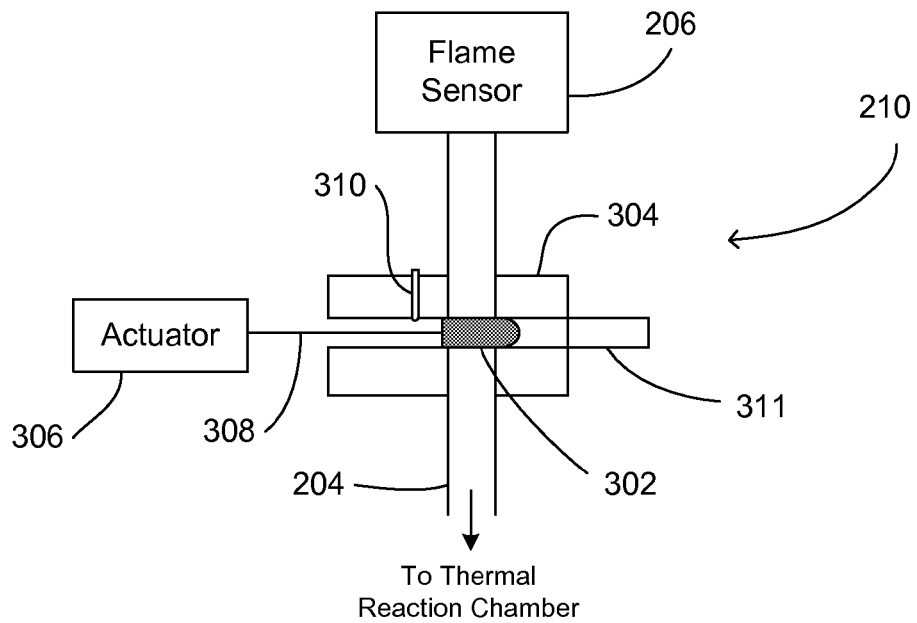
FIG. 3B is a schematic depiction of a shutter assembly of the present invention in a closed configuration.

FIGS. 3A and 3B are schematic representations of a shutter assembly 210, in the open (FIG. 3A) and in the closed (FIG. 3B) position. Turning to FIG. 3A, which depicts the shutter assembly, or shutter, 210 in the open position, the shutter assembly 210 may include a flame radiation blocking device 302, which may be adapted to move within a housing 304. The housing 304 may be any housing within which the flame radiation blocking device 302 may be moved into and out of a position where it may block flame radiation from inside the thermal reaction chamber from reaching the flame sensor 206. In some embodiments, the housing 304 may be a conduit which may form a cross shaped intersection with the flame radiation conduit 204. The flame radiation blocking device 302 may be a piston, a plunger, a flat sheet, or a body of any shape and size which is adapted to block flame radiation from the thermal reaction chamber from reaching the flame sensor 206. The shutter assembly apparatus 210 may further include a shutter actuator 306 which may be connected to the flame radiation blocking device 302 via a connector 308. In some embodiments the actuator 306 may be adapted to move the flame radiation blocking device 302 back and forth within the housing 304 in a reciprocating motion as indicated by the double headed arrow (FIG. 3A), such that the flame radiation blocking device 302 may alternately block and unblock the radiation conduit 204. Thus, the actuator 306 may be a pneumatic cylinder, a hydraulic cylinder, an electrical solenoid, a stepper motor, a servomotor, or any motive device which is capable of moving the radiation blocking device into and out of a position where the radiation blocking device 302 may block flame radiation from the thermal reaction chamber from reaching the flame sensor 206. When the radiation conduit 204 is blocked by the flame radiation blocking device 302, the flame sensor 206 may be unable to receive flame radiation from inside of the thermal reaction chamber (not shown). When the radiation conduit 204 is not blocked by the flame radiation blocking device 302, however, the flame sensor 206 may be able to receive flame radiation from inside of the thermal reaction chamber (not shown). FIG. 3B depicts the shutter assembly 210 in the closed position.

In some embodiments, the shutter may include an apparatus which may be used to determine the position of the shutter so that a controller may determine when the flame sensor should be reporting a flame-off condition, and when the flame sensor should be reporting a flame-on condition. For example, referring to FIGS. 3A and 3B, a microswitch 310 may be positioned such that when the shutter 210 is positioned to block radiation conduit 204 (FIG. 3B), a signal may be sent from microswitch 310 to the controller 212 to indicate that radiation conduit 204 is blocked. The controller 212 may then expect to receive a flame-off condition signal from sensor 206. Conversely, when shutter 210 is located in a position which does not block radiation conduit 204 (FIG. 3A), microswitch 310 may send a signal to the controller 212 indicating that the radiation conduit 204 is not blocked. The controller 212 may then expect to receive a flame-on condition signal from sensor 206. Any suitable switch or device may be used to detect the position of shutter 210.

The shutter assembly 210 may also include a purge gas port 311 through which a purge gas may be introduced into the housing 304 and the flame radiation conduit 204. As described above, the purge gas may be clean dry air (CDA), air, oxygen, nitrogen, argon, or any inert gas. Purge gas may flow continuously. The radiation blocking device 302 may be adapted to allow purge gas to flow between it and the housing 304 so that purge gas may enter the radiation conduit 204 even when the radiation blocking device 302 is in a blocking position. The purge gas may help prevent, or delay, the clogging of the radiation conduit 204, which may extend into the thermal reaction chamber 115 (FIG. 2).

Figure 3C:
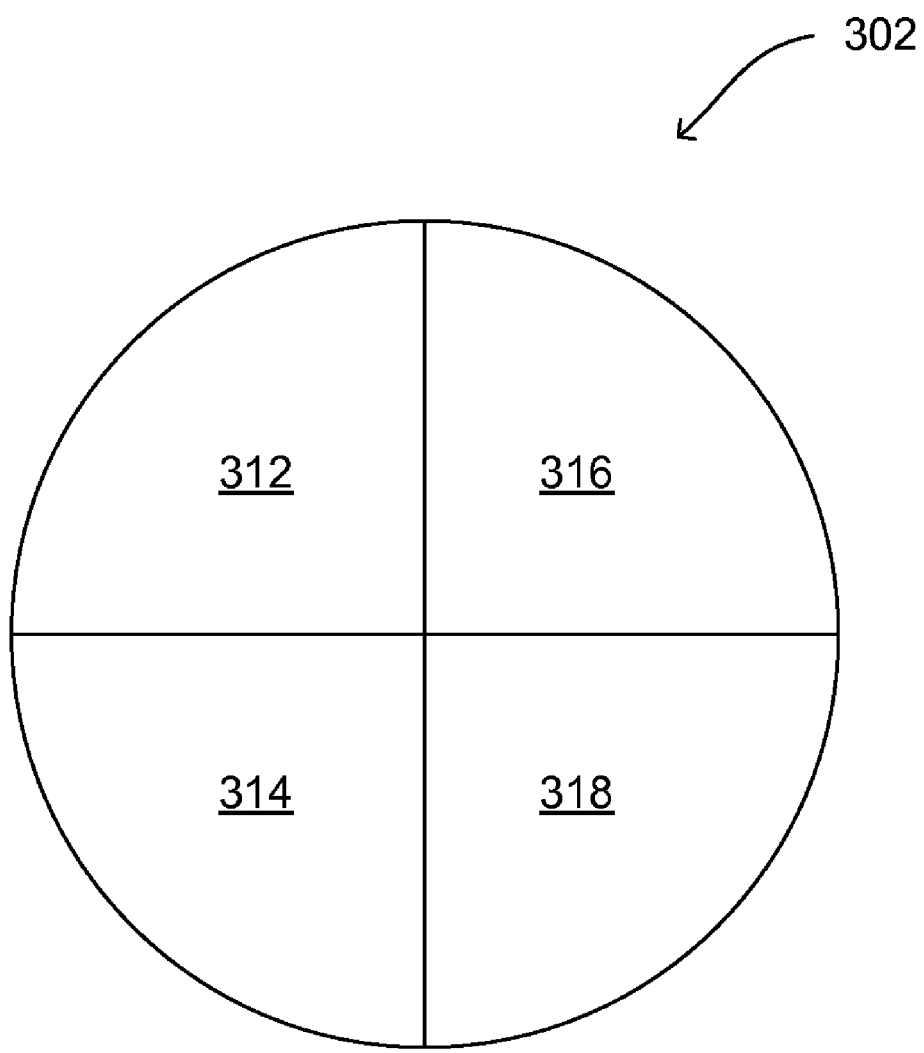
FIG. 3C is a schematic depiction of a flame radiation blocking device of the present invention.

In other embodiments, turning to FIG. 3C, the actuator 306 may be adapted to rotate a radiation blocking device 302. In these embodiments, the radiation blocking device 302 may be a disc shaped body having one or more flame radiation blocking and/or passage zones. As used herein, a passage zone is a portion of the flame radiation blocking device 302 which does not block flame radiation from reaching the flame sensor 206 and a blocking zone is a portion of the flame radiation blocking device 302 which does block flame radiation from reaching the flame sensor 206. Thus, in FIG. 3C, zones 312, 314, 316, and/or 318 may each be either a blocking zone or a passage zone, so long as there is at least one blocking zone and at least one passage zone. In addition, although depicted as four, equally sized, pie shaped zones, it should be understood that there may be 2, 3, 5, 6, 7, or more zones which may be of any shape and of different sizes. When a blocking zone is between the flame sensor 206 and the thermal reaction chamber 115, the shutter may be said to be closed. On the other hand, when a passage zone is between the flame sensor 206 and the thermal reaction chamber 115, the shutter may be said to be open. In addition, although the flame radiation blocking device 302 depicted in FIG. 3C is circular in shape, it is to be understood that the device may be any shape, such as, for example, triangular, square, rectangular, etc. The flame radiation blocking device 302 depicted in FIG. 3C may also have a solid rim 320 which may provide rigidity and balance to the device.

In such embodiments, where the actuator 306 is adapted to rotate a radiation blocking device 302, such as that depicted in FIG. 3C, the actuator 306 may be a motor, a stepper motor, or a servomotor or any other device capable of rotating the radiation blocking device 302 in the abatement environment. The axis of rotation may be parallel to the radiation conduit 204. If the actuator 306 is a stepper motor or a servomotor, then it may be adapted to send a signal to the controller 212 to indicate when the radiation conduit 204 is blocked by the radiation blocking device 302. If the actuator 306 is not capable of sending such a signal to the controller 212, then a microswitch 310 (such as that depicted in FIG. 3A) or other device which is capable of determining the position of the radiation blocking device 302 and sending a signal to the controller 212 may be used.

Turning back to FIG. 2, the shutter assembly 210 may enable a controller 212 to test the operation and/or integrity of the flame sensor 206. As discussed above, it is possible for a flame sensor 206, which is able to detect flame radiation and to provide a flame-on indication to a controller 212, to fail such that it will continue to provide a flame-on indication to the controller 212 even after the flame sensor 206 stops receiving flame radiation. Such a failure may create a hazardous situation.

To prevent and/or address such a hazardous situation, the controller 212 may perform a one time test of the flame sensor. Thus, the controller may command the shutter 210 to close, thereby blocking flame radiation from inside of the thermal reactor chamber 115 from being received by the flame sensor 206. If, as expected, the flame sensor 206 reports to the controller 212 during the blockage that there is a flame-off condition, then the flame sensor may be working properly, and the controller 212 may continue to operate the thermal reaction chamber. On the other hand, if the flame sensor 206 reports to the controller 212 during the blockage that there is a flame-on condition, then the controller may determine that the flame sensor may be malfunctioning (e.g., failed). The controller 212 may then shut down the thermal reaction chamber.

In an alternative embodiment, instead of the controller 212 commanding the shutter 210 to close, the shutter 210 may be operated automatically to open and close periodically. In such embodiments, the controller may receive a signal (e.g., from a microswitch, a stepper motor, and/or a servomotor, etc.) which indicates either that the shutter is closed or that the shutter is open. Upon receiving such a signal, the controller may expect to receive a flame-on signal from the flame sensor 206 when the shutter 210 is in the open position, and may expect to receive a flame-off signal from the flame sensor 206 when the shutter 210 is in the closed position. In some embodiments, the flame sensor 206 may be fault tested several times per minute, or several times per hour.

A desired timing or schedule of a closed shutter/open shutter cycle may be readily selected by one skilled in the art. For example, the shutter may be open and closed for equal alternating periods or for unequal alternating periods, where the open period may be longer than the closed period, or vice versa. Thus, the equal alternating periods may be between about 1 second and about 60 seconds or more, between about 2 seconds and about 45 seconds, or between about 3 seconds and about 30 seconds, each. In embodiments where the open periods are longer than the closed periods, the closed periods may be between 1 and about 10 seconds long, or about between 3 and about 5 seconds long or about 4 seconds long, and the open periods may be between about 2 to about 20, or about 4 to about 10 times as long as the closed periods. In embodiments where the open periods are shorter than the closed periods, the open periods may be between 1 and about 10 seconds long, or about between 3 and about 5 seconds long, or about 4 seconds long, and the closed periods may be between about 2 and about 20, or about 4 to about 10 times as long as the open periods. In the case of a reciprocating radiation blocking device, the open and closed periods may be created by moving the radiation blocking device into a blocking or a non-blocking position at appropriate intervals. In the case of a rotating radiation blocking device, the periods may be created by selecting appropriate blocking and passage zone sizes, and rotation speed.

In some embodiments, the controller 212 may be programmed to trigger an alarm or to shut down the abatement reaction chamber if the controller 212 does not receive a flame-on condition signal from the sensor 206 when the shutter 210 is open. In addition, the controller 212 may be programmed to trigger an alarm or shut down the reaction chamber if the controller 212 receives a flame-on condition signal from the sensor 206 when the shutter 210 is closed. It should be understood that to shut down the thermal reaction chamber may include shutting off fuel flow to the mail and/or pilot burners.

In some embodiments, the controller 212 may be adapted to receive a signal from the flame sensor 206 and to modify an operating parameter of the thermal abatement reactor based upon the signal. The operating parameters which the controller 212 may be adapted to so modify may include one or more of burner fuel flow, pilot fuel flow, oxidant flow, and effluent flow. Modifying the parameters may include stopping the flow of fuel, oxidant and/or effluent.

Figure 4:
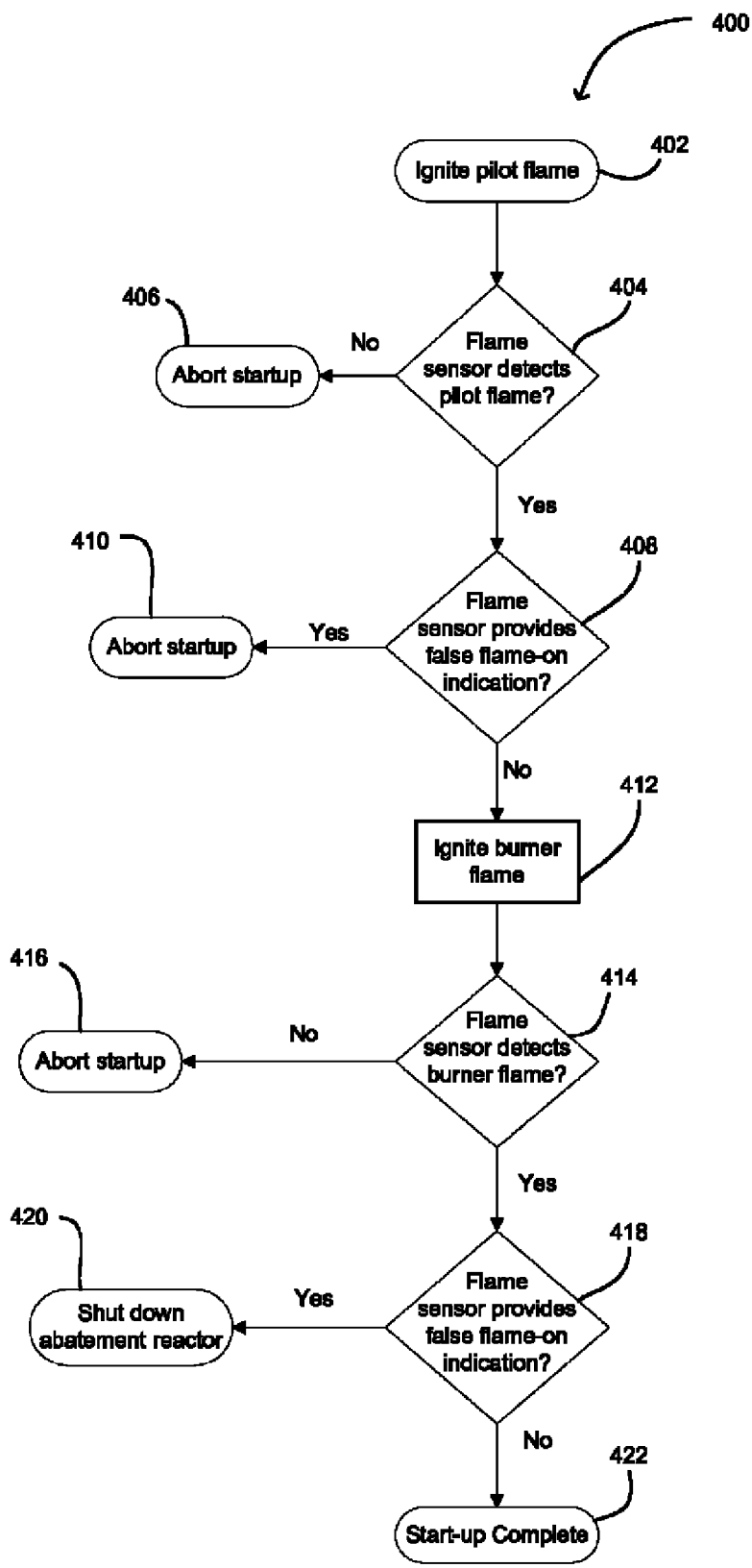
FIG. 4 is a flowchart depicting a method of the present invention for starting up a thermal abatement unit.

FIG. 4 is a flowchart depicting a method 400 of the present invention for starting up a thermal abatement unit. The startup method 400 begins in step 402 in which a pilot flame is ignited. The ignition of the pilot flame may be commanded by a controller, such as the controller 212 depicted in FIG. 2. In step 404, a flame sensor is used to detect whether the pilot flame has successfully ignited. If the flame sensor does not detect the pilot flame, the method ends in step 406 and the startup is aborted. If, in step 404, the flame sensor does detect the pilot flame, the startup method 400 proceeds to step 408 in which the flame sensor is fault tested. The flame sensor apparatus of the present invention may be used to fault test the flame sensor. Referring to FIG. 2, the shutter 210 is moved to the closed position which blocks the flame radiation from reaching the flame sensor 206. If the flame sensor 206 sends a flame-on signal to the controller 212 while the shutter 210 is in the closed position, the controller 212 determines that the flame sensor 206 is malfunctioning and the method 400 ends in step 410 and the startup is aborted. If the flame sensor 206 sends a flame-off signal to the controller 212 while the shutter 210 is in the closed position, the controller 212 determines that the flame sensor is functioning properly. The method 400 proceeds to step 412 in which a burner flame is ignited. The ignition of the burner flame may be commanded by the controller 212 and may include flowing fuel to the burner jets 140, which fuel is ignited by the pilot flame. In an optional step (not shown), the pilot flame may be extinguished following ignition of the burner flame. The method 400 proceeds to step 414 in which the flame sensor 206 is used to detect the burner flame. If the flame sensor 206 does not detect the burner flame in step 414, the method ends in step 416 and startup is aborted. If the flame sensor 206 does detect the burner flame in step 414, the method proceeds to step 418 in which the flame sensor 206 is fault tested. The fault test conducted during step 418 may be the same as the fault test conducted during step 408, with the exception that in step 418, the shutter 210 blocks flame radiation from the main burner flame. Similarly to step 408, if the flame sensor 206 sends a flame-on signal to the controller 212 while the shutter 210 is in the closed position, then the controller 212 determines that the flame sensor 206 is malfunctioning, and the method 400 proceeds to step 420 and the abatement reactor is shutdown. If the flame sensor 206 sends a flame-off signal to the controller 212 while the shutter 210 is in the closed position, then the controller 212 determines that the flame sensor 206 is functioning properly. The method 400 ends in step 422, in which the startup is completed.

In an alternative embodiment, steps 408, 410 may be omitted. In this embodiment, the method 400 proceeds from step 404 to step 412 if the flame sensor detects the pilot flame in step 404. In another alternative embodiment, steps 418, 420 may be omitted. In this embodiment, the method 400 proceeds directly from step 414 to step 422 if the flame sensor detects the burner flame in step 414. In yet another alternative embodiment, step 402 may be preceded by a step (not shown) in which the flame sensor is tested prior to ignition of the pilot flame. In this embodiment, the flame sensor 206 is used to detect flame within an abatement reactor which has not yet been started. If the controller 212 receives a flame-on signal from the flame sensor 206 prior to ignition of the pilot flame, the controller 212 determines that the flame sensor 206 is malfunctioning and the startup is aborted. On the other hand, if the controller 212 does not receive a flame-on signal from the flame sensor 206, the method 400 proceeds to step 402 in which the pilot flame is ignited.

Figure 5:
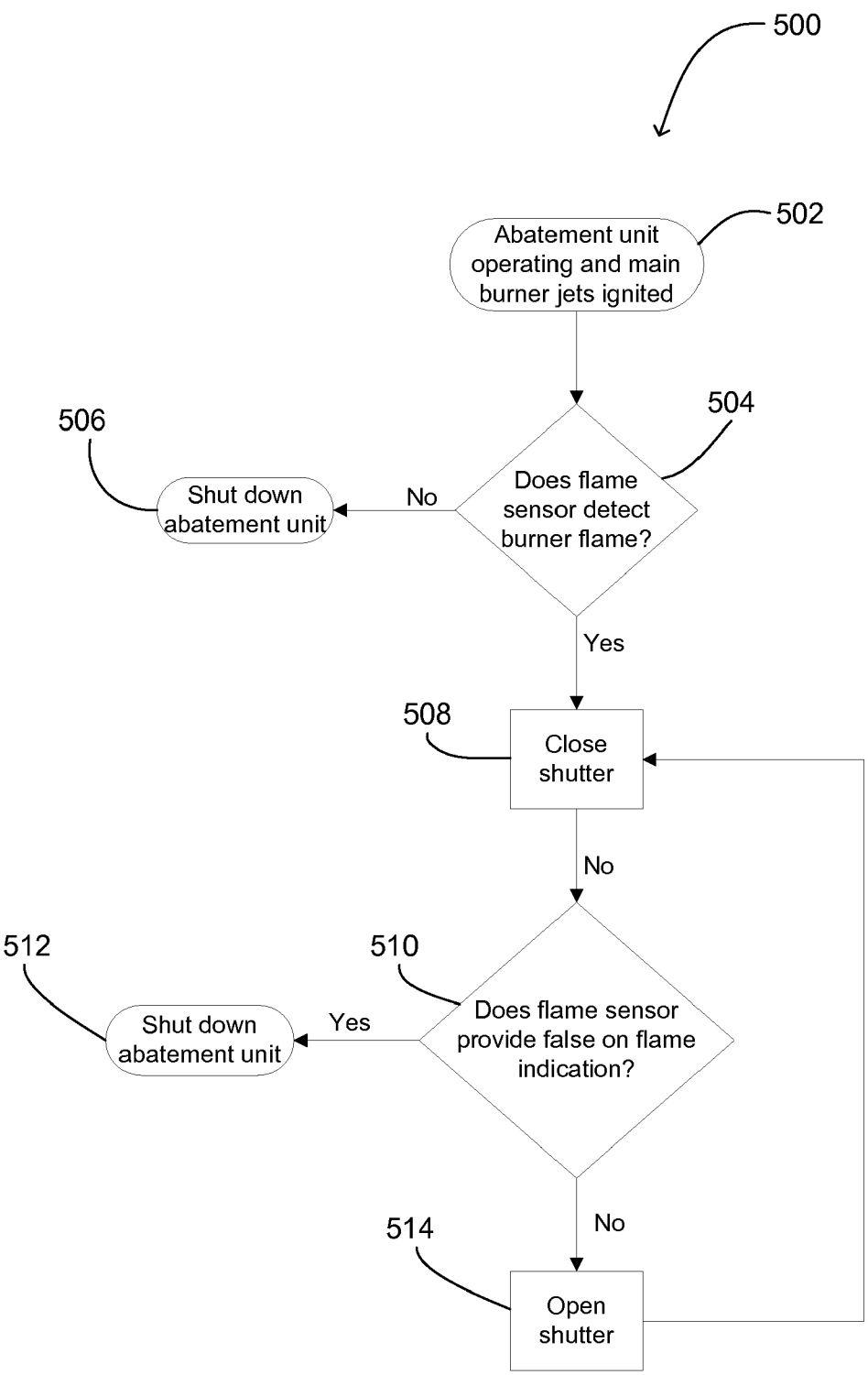
FIG. 5 is a flowchart depicting a method of the present invention for operating a thermal abatement unit.

FIG. 5 is a flowchart depicting a method 500 of the present invention for operating a thermal abatement reactor. Method 500 begins in step 502 in which the thermal abatement reactor is operating and main burner jets are producing main burner flames. The method 500 proceeds to step 504 in which a flame sensor is used to detect the main burner flames. If the main burner flames are not detected, then the method proceeds to step 506 in which the abatement unit is shutdown. If, in step 504, the flame sensor does detect burner flames, then the method 500 proceeds to step 508 in which a shutter apparatus of the present invention is closed to block flame radiation from the main burner flames from reaching the flame sensor. In step 510 a controller determines whether the flame sensor is providing a false flame-on indication while the shutter is closed. If the flame sensor is providing a false flame-on indication while the shutter is closed, then the method 500 proceeds to step 512 in which the abatement unit is shutdown. If the controller determines that the flame sensor is not providing a false flame-on indication while the shutter is closed, the method 500 proceeds to step 514 in which the shutter is opened. During step 514, the shutter may be maintained in the open position for any desired period of time. The method 500 loops to step 508, in which the shutter is closed, and proceeds as described above. The method 500 enables the thermal abatement reaction chamber to be operated while the flame sensor is periodically fault tested. In method 500, the controller may command both the opening and closing of the shutter, or the opening and closing of the shutter may be automatic and periodic.

The foregoing description discloses only exemplary embodiments of the invention. Modifications of the above disclosed apparatus and method which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. A method for operating a thermal abatement reactor comprising:
   a) igniting a burner flame;
   b) detecting the burner flame with a flame sensor;
   c) stopping a flow of fuel to the burner flame if the flame sensor does not detect the burner flame in step b);
   d) blocking a transmission of flame radiation from the burner flame to the flame sensor; and
   e) stopping a flow of fuel to the burner flame if the flame sensor indicates that the flame sensor detects the burner flame while the transmission of flame radiation is blocked in step d).

2. The method of claim 1 wherein the step of blocking the transmission of the flame radiation further comprises using a controller to command a shutter to block the transmission of radiation from the burner flame to the flame sensor.

3. The method of claim 1 wherein the step of blocking the transmission of the flame radiation further comprises moving a shutter to periodically block the transmission of the flame radiation from the burner flame to the flame sensor.

4. The method of claim 3 wherein the shutter comprises a flame radiation blocking device and the flame radiation blocking device is reciprocated in a linear path.

5. The method of claim 3 wherein the shutter comprises a flame radiation blocking device and the flame radiation blocking device is rotated.

* * * * *